United States Patent [19]

Elmore et al.

[11] Patent Number: 5,424,365
[45] Date of Patent: Jun. 13, 1995

[54] TWO PACKAGE AMBIENT TEMPERATURE CURING COATING COMPOSITION

[75] Inventors: Jim D. Elmore; Donald E. Babcock; William J. DeGooyer, all of Louisville, Ky.

[73] Assignee: McWhorter Technologies, Inc., Carpentersville, Ill.

[21] Appl. No.: 214,076

[22] Filed: Mar. 16, 1994

Related U.S. Application Data

[63] Continuation of Ser. No. 958,175, Oct. 8, 1992, abandoned, which is a continuation-in-part of Ser. No. 808,371, Dec. 16, 1991, abandoned, which is a continuation-in-part of Ser. No. 590,778, Oct. 1, 1990, abandoned.

[51] Int. Cl.$^6$ .................... C08L 63/10; C08L 33/02; C08L 33/08; C08L 33/10
[52] U.S. Cl. ................... 525/208; 525/221; 525/227; 525/241; 524/437
[58] Field of Search ............... 525/200, 221, 227, 208, 525/241; 524/437

[56] References Cited

PUBLICATIONS

*Organic Chemistry,* G. Marc Loudon, Addison-Wesley Publishing Co., 1984.

*Primary Examiner*—W. Robinson Clark
*Attorney, Agent, or Firm*—Fitch, Even, Tabin & Flannery

[57] ABSTRACT

An ambient curing coating composition made from at least two packages wherein one package contains a copolymer having acetoacetoxy groups and glycidyl groups plus an aluminum catalyst and the other package contains a copolymer having carboxylic acid groups plus a strong organic base catalyst.

14 Claims, No Drawings

TWO PACKAGE AMBIENT TEMPERATURE CURING COATING COMPOSITION

CROSS REFERENCE TO RELATED APPLICATION

This is a continuation of now abandoned application Ser. No. 07/958,175, filed Oct. 8, 1992, which is a continuation-in-part of Ser. No. 07/808,371, filed Dec. 16, 1991, now abandoned, which is a continuation-in-part of Ser. No. 07/590,778, filed Oct. 1, 1990, now abandoned.

BACKGROUND OF THE INVENTION

The field of art to which this invention pertains is coating compositions which cure at ambient temperatures.

Coating compositions which cure under ambient temperature conditions have been known for a long time. The earliest of such coating compositions are coatings based on drying oils which cure by air oxidation. Other coating compositions which have been developed more recently are those based on the epoxide-carboxylic acid reaction, isocyanate-active-hydrogen reaction, polyaziridine-carboxylic acid reaction, and activated methylene-unsaturated acrylic reaction.

Film forming interpolymers of acrylic acid, acetoacetoxyethyl methacrylate, and monomers copolymerizable therewith are described in U.S. Pat. No. 3,554,987.

In U.S. Pat. No. No. 4,408,018, polymers containing pendant acetoacetate moieties are mixed with polyacrylates which contain more than one unsaturated acrylic group and are cured through Michael addition using a strong base as catalyst.

Crosslinking through Michael addition is also shown in European Patent Application No. 227,454. In this patent application, compounds containing a plurality of pendant acetoacetate groups are blended with compounds containing a plurality of ethylenically unsaturated acrylic groups and are cured with the addition of a strong base or an organometallic compound.

South Africa Patent No. 85-2044 describes coating compositions curable at ambient temperatures made from compositions which contain a plurality of activated methylene groups and ethylenically unsaturated carbonyl groups.

In an article by A. Noomen, entitled "Ambient Temperature Curable Coatings Based on Two Pack Binders", Organic Coatings Conference, Athens, Greece, June 1987, coating compositions which cure through the Michael addition reaction of acetoacetate-ketimine groups and acrylic-malonate groups are discussed.

Curable coating compositions based on the epoxide-carboxylic acid reaction are disclosed in U.S. Pat. Nos. 3,305,601 and 4,028,294 and European Patent Application No. 226,171.

U.S. Pat. No. 4,558,076 describes low temperature curable coating compositions made from carboxylic acid group containing polymers, polyepoxides and, as catalysts, aluminum, titanium or zirconium alkoxides or complexes thereof with a chelating agent.

In a presentation made at the Water-Borne & Higher-Solids Coatings Symposium in New Orleans, LA. on Feb. 3-5, 1988 by Robert J. Clemens entitled "A Comparison of Catalysts for Crosslinking Acetoacetylated Resins via the Michael Reaction", coatings curable at ambient temperatures are described. These coatings are made from acetoacetylated resins, polyacrylates and strong base catalysts, and care through Michael addition.

In U.S. Pat. No. 4,906,684, ambient caring coating compositions are made from aqueous dispersions of copolymers containing acetoacetoxy groups, glycidyl groups and carboxylic acid groups.

U.S. Pat. No. 4,987,177 describes coating compositions which cure at ambient temperatures and which are made from (A) a copolymer of acrylic and vinyl monomers having pending from the polymer an amino group, and (B) an acrylic crosslinking monomer containing pendant glycidyl groups and acetoacetate groups.

There is a continuing need for ambient temperature curing coating compositions which have low volatile organic solvent content (VOC), lengthy pot life, and fast coating performance development upon application to a substrate.

SUMMARY OF THE INVENTION

This invention is directed to low volatile organic solvent content, East curing two package ambient temperature coating compositions with adequate pot life and performance development. In one aspect, this invention pertains to two package coating compositions which contain in one package copolymers having pendant acetoacetoxyester groups and pendant glycidyl ester groups, and, in the other package, copolymers containing pendant carboxylic acid groups. In another aspect, this invention relates to two package coating compositions catalyzed with aluminum complexes and strong bases that accelerate crosslinking in the applied film without sacrificing the pot life of the coating composition.

The coating composition of this invention is made from at least two packages which when mixed has a pot-life of at least about 8 hours, and which, when applied as a coating obtains usable properties within about 24 hours under ambient temperature conditions.

One package of this composition is comprised of an organic solvent solution of an addition copolymer derived from ethylenically unsaturated monomers and containing pendant acetoacetoxyalkyl ester groups and pendant glycidyl ester groups.

The other package of the composition of this invention is comprised of an organic solvent solution of an addition copolymer derived from ethylenically unsaturated monomers and containing pendant carboxylic acid groups, a portion of which are attached directly to the copolymer backbone with the remainder being separated from the backbone by a polyester group.

The first package, i.e., the package which contains the copolymer having pendant acetoacetoxy groups and glycidyl groups, contains an aluminum alkoxide and/or chelate, designed specifically to stabilize the polymer from premature reaction of the acetoxy groups with the glycidyl groups.

The second package, i.e., the package which contains the copolymer having pendant carboxylic acid groups, contains a strong organic base which catalyzes the crosslinking reaction of carboxylic acid groups, acetoacetoxy groups, and glycidyl groups when the two packages are blended together and applied as a coating.

DESCRIPTION OF THE INVENTION

Package A of this invention is an organic solvent solution of an addition copolymer derived from ethylenically unsaturated monomers wherein the copolymer contains pendant acetoacetoxyalkyl ester groups and pendant glycidyl ester groups. The monomers used to obtain the acetoacetoxyalkyl groups are acetoacetoxyalkyl acrylates or methacrylates wherein the alkyl group contains 2 to 4 carbon atoms. These monomers can be made by the reaction of hydroxyalkyl acrylate or methacrylate with diketene. The acetoacetoxyalkyl group contains a methylene group between two carbonyl groups and, due to this position, is said to be an "active" methylene group. Such active methylene groups are capable of Michael addition across double bonds and can react with epoxy groups.

The glycidyl ester groups in Package A are derived from glycidyl acrylate or methacrylate monomers. Such monomers can be made by the esterification of the polymerizable acid with glycidol or with epichlorohydrin followed by dehydrohalogenation. The glycidyl group is capable of reacting with active methylene groups, with carboxylic acid groups, and with other epoxide groups.

The copolymer of Package A is a copolymer of an acetoacetoxy group containing monomer, a glycidyl group containing monomer, and at least one other monomer copolymerizable therewith. These other monomers can be any of the well known polymerizable ethylenically unsaturated monomers as long as they are free of groups which can react with acetoacetoxy groups or glycidyl groups. Examples of suitable monomers are: aromatic monomers, e.g., styrene, or vinyl toluene; acrylic or methacrylic ester monomers, e.g., alkyl acrylate or methacrylate esters wherein the ester group contains from 1 to about 10 carbon atoms; cyano monomers, e.g. acrylonitrile or methacrylonitrile; and the like. Preferred other monomers are styrene, methyl methacrylate, butyl methacrylate, and butyl acrylate.

The package A copolymer contains about 10 to about 40 weight percent acetoacetoxy group containing monomer and about 10 to about 40 weight percent glycidyl group containing monomer wherein said weight percents are based on the total copolymer weight. Preferably, the weight percent of each of these monomers is about 20 to about 30 weight percent. If calculated on the basis of pendant groups, the copolymer contains about 7.8 to about 32 weight percent acetoacetoxy alkyl ester group

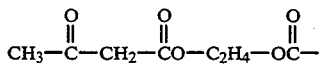

about 7 to about 28.5 weight percent glycidyl ester group

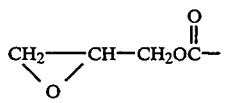

The preferred amounts for each of these groups is about 15.6 to about 24 weight percent acetoacetoxyalkyl ester group and about 14 to about 21.5 weight percent glycidyl ester group.

As stated hereinbefore, the methylene group in an acetoacetoxy group and an epoxide group will react with each other. In order to obtain storage stability for Package A with the aluminum compound, no protic hydrogens can be present. The aluminum compound used herein can be represented by the formula

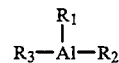

wherein $R_1$ is a chelate group containing the acetoacetoxy moiety, $R_2$ is either an alkoxide group or an acetoacetoxy group and $R_3$ is either an alkoxide group or an acetoacetoxy group. The alkoxide groups contain 2 to about 8 carbon atoms with the preferred group being the isopropoxide group. The chelate group can be represented by the formula

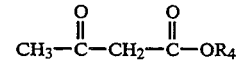

wherein $R_4$ is derived from a 2 to 4 carbon alcohol or a hydroxyalkyl ester of a polymerizable acid wherein the alkyl group contains 2 to 4 carbon atoms.

Preferred chelating compounds are ethylacetoacetate and acetoacetoxyethyl methacrylate. Preferably, the aluminum compound contains at least one group derived from acetoacetoxyethyl methacrylate.

In order to obtain a stable Package A, i.e., no or minimal acetoacetoxy-epoxy reaction on storage, a maximum of about 5 weight percent aluminum compound can be present in Package A.

Although the aluminum compound is designed for storage stability for Package A, it also contributes to the useful pot life of the coating composition when Package A is combined with the carboxylic acid containing package as well as catalyzing the cure of coatings made from the compositions as evidenced by faster film hardness developments. The amount of aluminum catalyst preferably is based on the total resin solids of the combined packages. This amount of aluminum compound is about 0.5 to about 5.0 weight percent, and, preferably, about 2.2 to about 2.8 weight percent.

Package B of this invention is an organic solvent solution of an addition copolymer derived from ethylenically unsaturated monomers wherein the copolymer contains pendant carboxylic acid groups wherein a portion of the carboxylic acid groups are attached directly to the copolymer backbone and the remaining carboxylic acid groups are attached through chain extension to the copolymer backbone. The carboxylic acid groups attached directly to the copolymer backbone are derived from polymerizable ethylenically unsaturated carboxylic acid monomers, examples of which are acrylic acid, methacrylic acid, maleic acid, fumaric acid, itaconic acid, citraconic acid, half esters of maleic and fumaric acid wherein the ester group contains one to 10 carbon atoms, and the like. The preferred acid monomers are acrylic acid and methacrylic acid.

The chain extension groups by which the other carboxylic acid groups are attached to the polymer backbone are polyester groups having about 8 to about 50 carbon and oxygen atoms in the polyester chain. In other words, the carboxylic acid groups are separated from the polymer chain by a polyester chain length of about 8 to about 50 atoms. These chain extended carboxylic acid groups are derived from polymerizable ethylenically unsaturated carboxylic acids, such as those described in the preceding paragraph, which have been further reacted to obtain this chain extension. The simplest monomer of this type is the reaction product of hydroxyethyl acrylate with succinic anhydride. A more complex monomer is the reaction product of hydroxyethyl acrylate and caprolactone to form a chain extended hydroxy terminated monomer which is then reacted with hexahydrophthalic anhydride. Another type of monomer is made by reacting a carboxylic acid monomer, e.g., methacrylic acid, with a monoepoxide, e.g., propylene oxide, and a cyclic dicarboxylic acid anhydride, e.g., phthalic anhydride.

The chain extended group which is attached to the copolymer backbone can be represented by the following formula:

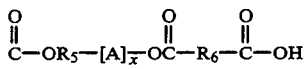

wherein $R_5$ is a $C_2$–$C_4$ alkylene group, $R_6$ is an alkyl, cycloalkyl, or aryl group containing 2 to 6 carbon atoms, A is

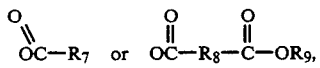

wherein $R_7$ is $C_4$–$C_6$ alkylene, and $R_8$ and $R_9$ are $C_2$–$C_6$ alkylene, arylene or cycloalkylene and x has a value of 0 to about 6.

A preferred monomer for use in making the chain extended carboxylic acid is described as a lactone-modified hydroxyethyl (meth) acrylate in U.S. Pat. No. 4,701,483 which is hereby incorporated by reference. Such monomers are made by the ring-opening polymerization of epsilon-caprolactone with hydroxyethyl (meth) acrylate. Monomers useful in this invention are those containing about 1 to about 6 ring opened caprolactone units, preferably about 1 to about 3. The chain-extended carboxylic acid group is made by reacting the lactone modified monomer with a cyclic dicarboxylic acid anhydride, such as succinic anhydride, maleic anhydride, phthalic anhydride, tetrahydrophthalic anhydride, hexahydrophthalic anhydride, chlorendic anhydride, and the like. A preferred anhydride is hexahydrophthalic anhydride.

The chain extended monomer used in Package B can be made as described hereinbefore by reacting a hydroxyl terminated monomer with a cyclic dicarboxylic acid anhydride. The monomer can also be made "in situ" by reacting the anhydride with a copolymer having a hydroxyimonomer polymerized therein.

Package B contains sufficient carboxylic acid groups to obtain an acid value of about 100 to about 150 wherein the simple carboxylic acid monomer and the chain extended monomer are present in the copolymer in the carboxylic acid equivalent ratio of about 60 to about 90 equivalents of simple acid to about 40 to about 10 equivalents of chain extended acid wherein the total acid equivalents are 100. Preferably, the ratio is about 75 to about 25.

Other monomers which can be copolymerized with the acid monomers in preparing the Package B copolymer are the same monomers which were described as being useful in the Package A copolymer as well as the fluorocarbon monomers sold by duPont under the "Zonyl" trademark and 3M under the trade name Fluorad Acrylates.

In addition to the carboxylic acid containing copolymer, Package B also contains a strong organic base, i.e., a quaternary ammonium hydroxide or alkoxide, or a tertiary amine wherein the base has a pK of at least 11 and, preferably, at least 12. Examples of such bases are tetramethyl ammonium hydroxide, tetramethyl ammonium methoxide, benzyl trimethyl ammonium hydroxide, tetramethyl guanidine, 1,5-diazabicyclo (4.3.0)-non-5-ene, 1,8-diazabicyclo(5.4.0) - undec-7-ene, triethylene diamine, and the like.

The amount of base used is based on the total weight of the resin solids in each package, and will vary from about 0.5 weight percent up to about 3 weight percent, preferably about 1 to about 2 weight percent.

The organic solvents in which the copolymers are dissolved are aprotic solvents, examples of which are aromatic and aliphatic hydrocarbons, esters, ethers and ether-esters. Specific solvents are butyl acetate, methyl propyl ketone, methyl amyl ketone, propylene glycol monomethyl ether acetate, ethylene glycol monomethyl ether acetate, ethylene glycol monoethyl ether acetate, ethyl-3-ethoxy propionate, xylene, toluene, mineral spirits, hexyl acetate, and the like. Each package is used at a resin solids content of about 40 to about 80 weight percent.

The copolymers used in this invention are prepared by conventional free radical catalyzed solution polymerization procedures well known to those skilled in the art. Preferred free radical catalysts used in preparing Package A copolymers are those which contain the t-amyl peroxy group, such as t-amylperoxy-2-ethylhexanoate, ethyl-3,3-di(t-amylperoxy) butyrate, 1,1-di(t-amylperoxy) cyclohexane, OO-t-amyl O-(2-ethylhexyl) monoperoxycarbonate, t-amylperoxybenzoate, t-amylperoxyacetate, or t-amylperoxy-3-carboxy propionate.

Preferred free radical catalysts used in preparing the package B copolymer are those which have a ten hour half life at 100° C. or above. Examples of such catalysts are dicumyl peroxide, cumene hydroperoxide, t-amyl peracetate, t-amyl perbenzoate, t-butyl perbenzoate, t-butyl peracetate, ethyl-3,3-di(t-amylperoxy) butyrate, di(t-amyl)peroxide, and the like.

In preparing the coating composition of this invention, Package A and Package B are blended in such amounts that there are about 1.05 to about 1.1 equivalents of acid for each equivalent of epoxide.

The coating composition of this invention is used as a clear coating, i.e., unpigmented, and can also be pigmented using any of the pigments which are used in paint manufacture, such as those disclosed in Kirk-Othmer "Encyclopedia of Chemical Technology", Second Edition, Vol. 15, pages 495–605. Although the pigments can be added to either package, it is preferred to use them in Package B.

Other additives which can be used in formulating the coating compositions of this invention are epoxide containing compositions and acetoacetoxy group containing compositions which are used as reactive diluents to lower the viscosity of the compositions and/or to affect the reactivity. Such compounds are ethylacetoacetate which is used in amounts up to about 2 weight percent based on resin solids in Package A. Other compounds are glycidyl compounds, e.g., diglycidyl ethers of dihydric phenols, such as Bisphenol A, and N-glycidyl compounds, such as N,N-diglycidyl aniline and hydrogenated m-xylene diamine tetraepoxide. Such epoxide containing compounds are used in Package A in amounts up to about 10 weight percent based on resin solids in Package A.

Other additives which can be used in this invention are flow modifiers which are well known to those skilled in the art.

The coating compositions of this invention are useful as decorative and protective coatings. One particular use is as a refinish coating for automobiles. Although specifically designed to be used and cured at room temperature, the compositions can also be cured with heat if so desired.

The following examples describe the invention in more detail. Parts and percentages, unless otherwise designated, are by weight.

EXAMPLE 1

Preparation of Package A Copolymer.

To a suitable reactor were added 300 parts of 1-methoxy-2-propyl acetate. To an addition funnel attached to the reactor were added a monomer-catalyst mixture of 105 parts of methyl methacrylate, 151.7 parts of styrene, 105 parts of butyl acrylate, 195 parts of acetoacetoxyethyl-methacrylate, 195 parts of glycidyl methacrylate and 62 parts of a solution of ethyl-3,3-di(t-amylperoxy) butyrate at 75 percent solids in mineral spirits. The reactor was flushed with nitrogen and heat and agitation were applied. When the temperature of the solvent reached 145° C., the addition of the monomer-catalyst solution was begun. The addition was completed in 2 hours with the temperature being held at 140°–145° C. Heating at 138°–143° C. was continued for 1 hour. An additional 8.8 parts of catalyst solution were added and heating at 120°–130° C. was continued for 40 minutes. The resulting polymer solution had a solids content of 71.0 percent and an epoxide equivalent weight of 822 based on resin solids.

The reactor was then fitted for vacuum distillation and essentially all of the 1-methoxy-2-propyl acetate were removed by heating to a pot temperature of 130° C. and a vacuum of 5 cm Hg pressure. Butyl acetate, 250 parts, was then added. The resulting solution had a Gardner-Holdt viscosity at 25° C. of $Z-Z_1$ and a solids content of 74.8 percent.

Preparation of Package B Copolymer

To a suitable reactor were added 273 parts of ethyl-3-ethoxypropionate. To an addition funnel attached to the reactor was added a monomer-catalyst solution of 141 parts of methyl methacrylate, 141 parts of styrene, 174 parts of butyl acrylate, 50 parts of lactone modified hydroxyethylmethacrylate which contained an average of 1.0 caprolactone units per molecule, 27 parts of hydroxyethyl methacrylate, 100 parts of methacrylic acid, 4.5 parts of "Zonyl" TM fluoro-methacrylate, (fluorine containing monomer obtained from dupont having an average perfluorocarbon chain length of about 8 carbon atoms), and 39 parts of dicumyl peroxide. The reactor was flushed with nitrogen and heat and agitation were applied. With the temperature at 160° C., the addition of the monomer-catalyst solution was begun. The monomer-catalyst solution was added over 2 hours and 20 minutes while holding the temperature at 160° C. Heating at 160°–170° C. was continued for 2 hours and 27 minutes. The reactor was then equipped for vacuum distillation to remove the solvent. The pot temperature was held at 170° C. and vacuum to 15 torr was reached after 13 minutes. The temperature was then lowered to 121° C. Hexahydrophthalic anhydride, 86 parts, and butyl acetate, 300 parts, were added and the reactants were heated at 95°–105° C. for 43 minutes. The resulting copolymer solution had a solids content of 68.3 percent, a Gardner-Holdt viscosity at 25° C. of $Z_3$ and an acid value, on solids basis, of 133.

EXAMPLE 2

Preparation of Package A

The Package A copolymer from Example 1, 54.01 parts, was blended with 3.7 parts of the diglycidyl ether of Bisphenol A having an epoxide equivalent weight of 190, 1.85 parts of hydrogenated m-xylene diamine tetraepoxide having an epoxide equivalent weight of 105, 35.65 parts of methylpropyl ketone, 0.8 part of hexylacetate, and 4.0 parts of an aluminum alkoxide-chelate (1 equivalent of isopropanol, 1 equivalent of ethyl acetoacetate and 1 equivalent of acetoacetoxyethyl methacrylate per Al), at 60 percent solids in mineral spirits. The resulting blend had a viscosity, at 25° C. of 10 cps.

After 1 week the viscosity (Gardner-Holdt at 25° C.) was $A_1$–A. After 1 month and 2 months the viscosity was still $A_1$–A.

Preparation of Package B.

A pigment grind was made from 25.22 parts of the Package B copolymer solution from Example 1, 57.31 parts of titanium dioxide and 17.47 parts of methylpropyl ketone by grinding for 3 hours in a pebble mill.

The pigment grind, 80.51 parts, was blended with 5.56 parts of a 25 percent solution of tetramethylammonium hydroxide in methanol, 1.39 parts of triethylenediamine, 2.39 parts of the Package B copolymer solution from Example 1 and 0.15 part of fluorocarbon acid flow modifier. The resulting blend had a viscosity, at 25° C., of 300 cps .

Preparation of Paint

Package A, 1 part, was blended with Package B, 2 parts. The resulting blend had a solids content of 65 percent (1 hr at 110° C.) and a viscosity of 190 cps (RVT Brookfield, #2 spindle at 100 rpm). The useful pot life of the blend was 22 hours. The time to gel was 10 days. After a 30 minute induction period, draw downs (1 mil dry film thickness) on steel panels reached a 3B pencil hardness in about 3 days and passed 17 MEK double rubs. After 30 days at room temperature, the paint had cured to a pencil hardness of HB, had a 60° gloss of 87 and passed 100 methylethyl ketone (MEK) double rubs.

EXAMPLE 3

A paint was made using the same procedure and components of Example 2 except that the aluminum catalyst was replaced with one having 1 equivalent of ethyl acetoacetate and 2 equivalents of acetoacetoxyethyl methacrylate on the aluminum.

Package A had a Gardner-Holdt viscosity at 25° C. of $A_1$–A after 1 week and after 1 month, and a viscosity of B after 2 months.

The viscosity of the paint made after blending Package A and Package B was B-C. The useful pot life was 15 hours. The time to gel was 10 days.

After a 30 minute induction period, draw downs (1 mil dry film thickness) were made on steel panels. After 3 days, the pencil hardness was 5B-4B and the films passed 21MEK double rubs. After 30 days, the hardness was HB and the films passed 105 MEK double rubs.

EXAMPLE 4

The Package A copolymer of Example 1, 19.549 parts, was blended with 9.3 parts of methylpropyl ketone, 1.472 parts of an aluminum alkoxide-chelate (1 equivalent of isopropanol, 1 equivalent of ethyl acetoacetate and 1 equivalent of acetoacetoxyethyl methacrylate to 1 aluminum) at 60 percent solids in mineral spirits, 0.3408 part of hydrogenated m-xylene diamine tetraepoxide, and 2.045 parts of the diglycidyl ether of Bisphenol A. The blend had a Gardner Holdt viscosity at 25° C. of $A_2$-$A_1$. After 2 months, the viscosity was $A_1$-A.

To 25 parts of the Package B copolymer solution of Example 1 were added 0.353 part of triethylene diamine, 1.41 parts of a 25 percent solution of tetramethyl ammonium hydroxide in methanol, 0.03 part of flow control agent and 5.91 parts of methylpropyl ketone. To this blend were added 32.7 parts of the blend made with the Package A copolymer. The resulting coating composition had a Gardner-Holdt viscosity at 25° C. of B and a useable pot life of 18 hours. The blend gelled in 14 days.

Thirty minutes after mixing, films (1 mil dry film thickness) were drawn down on steel panels. The pencil hardness was 5B-4B after 3 days, and the MEK resistance was 8 double rubs. After 30 days the hardness was HB-F and the MEK double rub resistance was 68.

EXAMPLE 5

A coating composition was made using the same procedure and components described in Example 4 except the aluminum catalyst was replaced with one made with 1 equivalent of ethyl acetoacetate and 2 equivalents of acetoacetoxyethyl methacrylate to 1 aluminum. The Package A component blend had an initial viscosity, Gardner-Holdt at 25° C., of $A_3$-$A_2$. After 2 months, the viscosity was A.

The paint composition, i.e., the blends of Packages A and B, had an initial viscosity of B-C. The useful pot life was 21 hours and the time to gel was 13 days.

Films were prepared on steel panels as described in the preceding examples. The pencil hardness after 3 days was 5B-4B and the MEK resistance was 6 double rubs. After 30 days, the pencil hardness was HB-F and the MEK resistance was 80 double rubs.

A coating composition was made exactly as described above except the aluminum catalyst in Package A was aluminum tri-isopropoxide. The Package A composition exhibited instability after 1 month.

EXAMPLE 6

Using the same procedure described in Example 1 for the preparation of Package B copolymer, a monomer catalyst mixture of 142 parts of methyl methacrylate, 142 parts of styrene, 175 parts of butyl acrylate, 50 parts of the lactone modified hydroxyethylmethacrylate described in Example 1, 27 parts of hydroxyethyl methacrylate, 100 parts of methacrylic acid, 1.3 parts of "Zonyl" MPD 6669 fluoro acrylate (fluorine containing monomer obtained from dupont having a perfluorocarbon chain length of about 6 carbon atoms) and 39 parts of dicumyl peroxide was polymerized in 273 parts of ethyl-3-ethoxypropionate. When the polymerization was complete, the solvent was removed by vacuum distillation, followed by reaction with 86 parts of hexahydrophthalic anhydride in 312 parts of butyl acetate. The resulting polymer solution had a viscosity of $Z_2$-$Z_3$ (Gardner-Holdt at 25° C.), a solids content of 70.4 percent and an acid value of 126.

EXAMPLE 7

The Package A copolymer solution of Example 1 (30 parts) was blended with 14 parts of methylpropyl ketone, 1.66 parts of an aluminum alkoxide-chelate solution (one equivalent of isopropanol, one equivalent of ethyl acetoacetate and one equivalent of acetoacetoxyethylmethacrylate) at 60 percent solids in mineral spirits, 1.41 parts of hydrogenated m-xylene diamine tetraepoxide, and 0.1 part of flow control agent. The blend had a Gardner-Holdt viscosity at 25° C. of $A_2$. After 2 months the viscosity was $A_1$-A.

To 33.69 parts of the Package B copolymer solution of Example 6 were blended 9.5 parts of methylpropyl ketone, 0.49 part of triethylene diamine, and 1.96 parts of tetramethyl ammonium hydroxide at 65 percent solids in methanol. The viscosity of the blend was D-E (Gardner Holdt at 25° C.), and after 1 week, it was E-F.

Package A and Package B were combined on an equal weight basis. The resulting coating composition had an initial viscosity of $A_1$-A and a pot life of about 12 hours. The composition gelled in 10 days.

Thirty minutes after mixing, films were drawn down on steel panels to 1 ml dry film thickness. The films were tack free in 30 minutes and tape free in 6½ hours. The films developed a pencil hardness of 3B in 3 days and a hardness of HB in 30 days. The MEK resistance was 30 double rubs in 3 days and 80 double rubs in 30 days.

EXAMPLE 8

A coating composition was made using the same procedure, components and amounts as described in Example 7 except the aluminum catalyst was replaced with one made from 2 equivalents of isopropanol and one equivalent of ethyl acetoacetate to 1 aluminum. Package A had an initial viscosity of $A_2$-$A_1$. After 24 hours, the viscosity was A-B. After 2 months it was C.

The coating composition (blend of Package A and Package B) had an initial viscosity of A and a pot life of 7 hours. Films on steel panels developed a pencil hardness of 3B in 3 days and HB in 30 days. The MEK resistance was 30 double rubs in 3-4 days, and 100 double rubs in 30-40 days.

When the aluminum alkoxide chelate catalyst in Package A was replaced with an aluminum alkoxide catalyst made from 2 equivalents of isopropanol and 1 equivalent of 2-ethyl-hexanol, Package A gelled within minutes after the catalyst was added.

EXAMPLE 9

Using the same procedure described in Example 6, a copolymer was prepared in ethyl-3-ethoxypropionate from 8.30 parts of methyl methacrylate, 16.61 parts of styrene, 3.74 parts of butyl acrylate, 16.50 parts of the lactone modified hydroxyethyl methacrylate described in Example 1, 0.47 part of fluorine containing monomer described in Example 1, and 20.13 parts of hydroxyethyl methacrylate using 4.05 parts of dicumyl peroxide as catalyst. The resulting copolymer was then reacted with 34.25 parts of hexahydrophthalic anhydride. The solvent was removed by vacuum distillation and was replaced with butyl acetate. The resulting product had a solids content of 70.65 percent and a viscosity of X-Y.

EXAMPLE 10

To a suitable reactor were added 99.40 parts of methylamyl ketone. To a monomer addition container were added 367.5 parts of methyl methacrylate, 525 parts of styrene, 367.5 parts of butyl acrylate, 682.5 parts of acetoacetoxyethyl methacrylate, 682.5 parts of glycidyl methacrylate and 271.25 parts of t-amyl peracetate. Heat and agitation were applied to the reactor raising the temperature to 142° C. The monomer-catalyst mixture was added over a 2 hour period while holding the temperature at 142°-148° C. Heating at 142° C. was continued for 2 hours. At the end of the heating period, the temperature was lowered to ambient temperature and the copolymer solution was filtered through a double 80 mesh bag. The resulting copolymer solution had a Gardner-Holdt viscosity at 25° C. of T-U, at 70 percent solids, and a Gardner color of 2.

EXAMPLE 11

A pigment grind was prepared from 213.7 parts of the Package B copolymer solution of Example 1.110 parts of methylamyl ketone and 500 parts of titanium dioxide by grinding in a steel ball mill for 13 hours. The resulting pigment grind had a viscosity of 140 seconds, #4 Ford cup.

EXAMPLE 12

A coating composition was prepared as follows:
Package A
To a suitable container were added 55.9 parts of the copolymer solution of Example 10, 3.75 parts of the diglycidyl ether of Bisphenol A, 1.876 parts of hydrogenated m-xylene diamine tetraepoxide, 4.116 parts of a 60 percent solids solution in mineral spirits of an aluminum alkoxide-chelate containing 1 equivalent of isopropanol, 1 equivalent of ethylacetoacetate and 1 equivalent of acetoacetoxyethyl methacrylate per aluminum, 0.188 part of flow control agent and 34.17 parts of methylpropyl ketone. After thorough mixing, the composition had a viscosity of $A_5$-$A_4$. After 8 days the viscosity was $A_4$. After 2 months, the viscosity was still $A_4$.
Package B
To a suitable container were added 81.984 parts of the pigment grind of Example 11, 7.844 parts of the Package B copolymer solution described in Example 1, 6.972 parts of the Package B copolymer solution described in Example 9, 0.985 part of triethylene diamine, 0.244 part of amine functional silane, and 1.971 parts of a solution of 25 percent tetramethylammonium hydroxide in methanol. After thorough mixing and standing overnight, the viscosity was 1400 cps at 25° C.
Paint Composition
One part of Package A was blended with 2 parts of Package B. The Brookfield viscosity immediately after mixing was 320 cps (No. 4 spindle at 50 RPM) and 250 cps (No. 4 spindle at 100 RPM). After 6 hours and 40 minutes, the viscosity was 530 and 620 cps respectively. The composition gelled in 9 days.

Three hours and 25 minutes after mixing, 2 mil draw downs were made on glass. The films were print free in 20 minutes and tape free in 1 hour and 45 minutes. The films after 24 hours exhibited a 60° gloss of 85-90, and after 4 days, a gloss of 87-84; after 4 weeks the gloss was 81. The pencil hardness after 24 hours was 5B; after 4 days HB; after 4 weeks H. The solvent resistance after 24 hours was 3-4 double rubs (MEK); after 4 days - 15-20 double rubs; after 4 weeks - 90 double rubs.

Paint films heated at 200° F. for 30 minutes exhibited MEK resistance of greater than 200 double rubs.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A two package composition which when mixed forms an ambient curing coating composition comprising:
   (A) in one package an organic solvent solution of an addition copolymer derived from ethylenically unsaturated monomers and containing from about 10 to about 40 weight percent pendant acetoacetoxyalkyl ester groups and from about 10 to about 40 weight percent pendant glycidyl ester groups and a catalytic amount of an aluminum alkoxide-chelate represented by the formula:

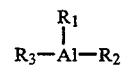

wherein $R_1$ is a chelate group containing the acetoacetoxy moiety, $R_2$ is either an alkoxide group or an acetoacetoxy chelate group, and $R_3$ is either an alkoxide group or an acetoacetoxy chelate group; and
   (B) in a second package an organic solvent solution of an addition copolymer derived from ethylenically unsaturated monomers and containing from about 60 to about 90 equivalents pendant carboxylic acid groups attached directly to the copolymer backbone and from about 40 to about 10 equivalents pendant carboxylic acid groups attached through chain extension to the copolymer backbone, wherein the copolymer has an acid value of from about 100 to about 150, wherein the chain extended carboxylic acid group has the structure

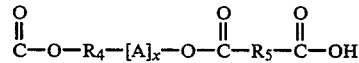

wherein $R_4$ is a $C_2$-$C_4$ alkylene group, $R_5$ is an alkyl, cycloalkyl, or aryl group containing 2 to about 6 carbon atoms, A is

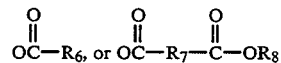

wherein $R_6$ is $C_4$-$C_6$ alkylene, and $R_7$ and $R_8$ are $C_2$-$C_4$ alkylene, arylene or cycloalkylene, and x has a value of 0 to about 6, and a catalytic amount of a strong organic base having a pK of at least 11, wherein each package has a resin solids content of about 40 to about 80 weight percent, and wherein a mixture of (A) and (B) has a pot-life of at least about 8 hours.

2. The composition of claim 1 wherein the package A copolymer is a copolymer of about 10 to about 40 weight percent of an acetoacetoxy group containing monomer, about 10 to about 40 weight percent of a glycidyl group containing monomer with the remainder to total 100 weight percent being a comonomer copolymerizable therewith, wherein said comonomer is free of groups reactive with acetoacetoxy groups and glycidyl groups.

3. The composition of claim 2 wherein the package A copolymer is a copolymer of acetoacetoxyethyl methacrylate, glycidyl methacrylate and a comonomer selected from at least one member of the group consisting of styrene, methyl methacrylate, butylmethacrylate, ethyl acrylate, and butylacrylate.

4. The composition of claim 2 wherein the acetoacetoxy group containing monomer is present in the amount of about 20 to about 30 weight percent and the glycidyl group containing monomer is present in the amount of about 20 to about 30 weight percent.

5. The composition of claim 4 wherein the acetoxy group containing monomer is acetoacetoxyethyl methacrylate, wherein the glycidyl group containing monomer is glycidyl methacrylate and the comonomer is selected from at least one member of the group consisting of styrene, methyl methacrylate, butyl methacrylate, ethyl acrylate, and butyl acrylate.

6. The composition of claim 1 wherein the non-chain extended monomer is acrylic acid and the chain-extended monomer is the reaction product of hydroxyethyl methacrylate and hexahydrophthalic anhydride.

7. The composition of claim 1 wherein the non-chain extended monomer is methacrylic acid and the chain extended monomer is the reaction product of hydroxyethyl methacrylate and epsiloncaprolactone containing about 1 to about 3 ring-opened caprolactone units further reacted with hexahydrophthalic anhydride.

8. The composition of claim 1 wherein the ratio of non-chain extended monomer to chain extended monomer is about 75 equivalent to about 25 equivalents.

9. The composition of claim 1 wherein $R_1$ is the isopropoxide group, $R_2$ is chelated ethyl acetoacetate and $R_3$ is chelated acetoacetoxyethyl methacrylate.

10. A coating composition comprising a blend of:
(A) an organic solvent solution of an addition copolymer derived from ethylenically unsaturated monomers and containing from about 10 to about 40 weight percent pendant acetoacetoxyalkyl ester groups and from about 10 to about 40 weight percent pendant glycidyl ester groups and a catalytic amount of an aluminum alkoxide-chelate represented by the formula:

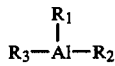

wherein $R_1$ is a chelate group containing the acetoacetoxy moiety, $R_2$ is either an alkoxide group or an acetoacetoxy chelate group, and $R_3$ is either an alkoxide group or an acetoacetoxy chelate group; and
(B) an organic solvent solution of an addition copolymer derived from ethylenically unsaturated monomers and containing from about 60 to about 90 equivalents pendant carboxylic acid groups attached directly to the copolymer backbone and from about 40 to about 10 equivalents pendant carboxylic acid groups attached through chain extension to the copolymer backbone, wherein the copolymer has an acid value of from about 100 to about 150, wherein the chain extended carboxylic acid group has the structure

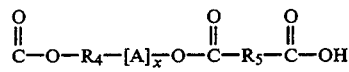

wherein $R_4$ is a $C_2$–$C_4$ alkylene group, $R_5$ is an alkyl, cycloalkyl, or aryl group containing 2 to about 6 carbon atoms, A is

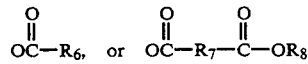

wherein $R_6$ is $C_4$–$C_6$ alkylene, and $R_7$ and $R_8$ are $C_2$–$C_4$ alkylene, arylene or cyctoalkylene, and x has a value of 0 to about 6, and a catalytic amount of a strong organic base having a pK of at least 11, wherein (A) and (B) each have a resin solids content of about 40 to about 80 weight percent, wherein a mixture of (A) and (B) has a pot-life of at least about 8 hours, and wherein (A) and (B) are blended in such amounts that there are about 1.05 to about 1.1 equivalents of acid groups for each equivalent of epoxide.

11. The composition of claim 10 wherein the copolymer in (A) is a copolymer of about 10 to about 40 weight percent acetoacetoxy group containing monomer, about 10 to about 40 weight percent of a glycidyl group containing monomer with the remainder to total 100 weight percent being a comonomer copolymerizable therewith, wherein said comonomer is free of groups reactive with acetoacetoxy groups and glycidyl groups.

12. The composition of claim 11 wherein the copolymer in A is a copolymer of acetoacetoxyethyl methacrylate, glycidyl methacrylate and a comonomer selected from at least one member of the group consisting of styrene, methylmethacrylate, butylmethacrylate, ethyl acrylate, and butyl acrylate.

13. The composition of claim 12 wherein the acetoacetoxy group containing monomer is present in the amount of about 20 to about 30 weight percent and the glycidyl group containing monomer is present in the amount of about 20 to about 30 weight percent.

14. The composition of claim 13 wherein the acetoxy group containing monomer is acetoacetoxyethyl methacrylate, wherein the glycidyl group containing monomer is glycidyl methacrylate and the comonomer is selected from at least one member of the group consisting of styrene, methyl methacrylate, butyl methacrylate, ethyl acrylate, and butyl acrylate.

* * * * *